US012664704B2

(12) United States Patent
Härter et al.

(10) Patent No.: US 12,664,704 B2
(45) Date of Patent: Jun. 23, 2026

(54) METHOD AND VISUALIZATION SYSTEM FOR DISPLAYING IMAGE DATA

(71) Applicant: Schölly Fiberoptic GmbH, Denzlingen (DE)

(72) Inventors: Daniel Härter, Emmendingen (DE); Franziska Wilhelm, Gutach (DE)

(73) Assignee: Scholly Fiberoptic GmbH, Denzlingen (DE)

( * ) Notice: Subject to any disclaimer, the term of this patent is extended or adjusted under 35 U.S.C. 154(b) by 266 days.

(21) Appl. No.: 18/462,560

(22) Filed: Sep. 7, 2023

(65) Prior Publication Data

US 2024/0087195 A1     Mar. 14, 2024

(30) Foreign Application Priority Data

Sep. 9, 2022     (DE) .......................... 102022123045.7

(51) Int. Cl.
H04N 5/262          (2006.01)
G06T 11/60          (2006.01)
H04N 5/272          (2006.01)

(52) U.S. Cl.
CPC ........... G06T 11/60 (2013.01); H04N 5/2624 (2013.01); H04N 5/272 (2013.01); G06T 2210/41 (2013.01)

(58) Field of Classification Search
CPC ... G06T 11/60; G06T 2210/41; H04N 5/2624; H04N 5/272
See application file for complete search history.

(56) References Cited

U.S. PATENT DOCUMENTS

| | | | | |
|---|---|---|---|---|
| 7,259,729 B2* | 8/2007 | Shastri | ................. | G06F 3/1431 |
| | | | | 345/1.3 |
| 2018/0293773 A1* | 10/2018 | Kohle | .................... | G16H 30/20 |
| 2021/0275264 A1* | 9/2021 | Johnson | ................. | G16H 30/20 |
| 2022/0294992 A1* | 9/2022 | Manzari | ............... | H04N 23/632 |
| 2023/0147826 A1* | 5/2023 | Zhao | ................... | A61B 1/0005 |
| | | | | 345/419 |

FOREIGN PATENT DOCUMENTS

| | | |
|---|---|---|
| CN | 113742506 | 12/2021 |
| DE | 102019118752 | 2/2021 |
| WO | 2022143867 | 7/2022 |

\* cited by examiner

*Primary Examiner* — Mekonnen D Dagnew
(74) *Attorney, Agent, or Firm* — Volpe Koenig

(57) ABSTRACT

A method and a visualization system for displaying image data are provided, which, based on a set of different sequences, which are already predefined and stored in a memory, of visualization modes following one another in a specific order, always only provides a limited subselection of overall visualization modes usable using the visualization system for selection to a user, so that the user can change back and forth quickly and efficiently with the aid of an input between the visualization modes which are best suitable for the present application of the visualization system.

14 Claims, 8 Drawing Sheets

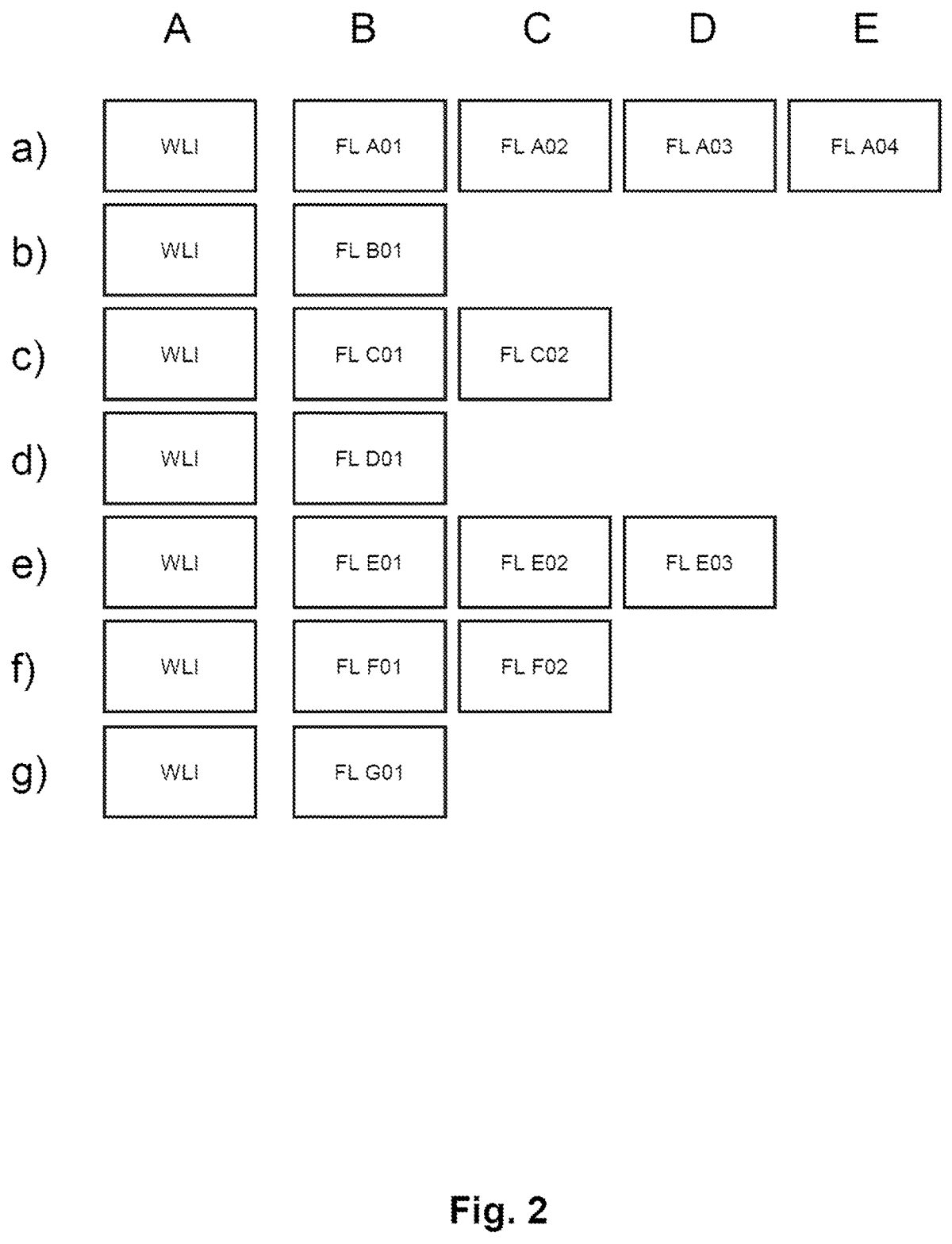

|  | A | B | C | D | E |
|---|---|---|---|---|---|
| a) | WLI | FL A01 | FL A02 | FL A03 | FL A04 |
| b) | WLI | FL B01 | | | |
| c) | WLI | FL C01 | FL C02 | | |
| d) | WLI | FL D01 | | | |
| e) | WLI | FL E01 | FL E02 | FL E03 | |
| f) | WLI | FL F01 | FL F02 | | |
| g) | WLI | FL G01 | | | |

Fig. 2

METHOD AND VISUALIZATION SYSTEM FOR DISPLAYING IMAGE DATA

CROSS-REFERENCE TO RELATED APPLICATIONS

This application claims priority from German Patent Application No. 10 2022 123 045.7, filed Sep. 9, 2022, which is incorporated herein by reference as if fully set forth.

TECHNICAL FIELD

The invention relates to a method and a system (visualization system) for visualizing image data, in particular a method for simplified changing of a visualization mode to be used. In this case, the system can be designed in particular as a medical visualization system, for example, in the form of a microscope, an exoscope, or an endoscope. The invention therefore relates in particular to a method for simplified operation of such a medical visualization system, in particular to display a live image, which can be generated from a continuous video image data stream, in a suitable manner on the display device of the visualization system.

BACKGROUND

Advanced imaging is a class of imaging methods which are gradually finding broader application in medicine. Additional information, often in addition to classic white light imaging, can be visualized to the user using such novel imaging methods. The user can be assisted using such approaches in making image contents relevant for the respective medical application (such as an autofluorescence signal) visible in the best possible manner, which can be important, for example, to enable precise medical diagnostics and the best possible subsequent surgical treatment.

Visualization systems are already known here, which process received image data and can display the processed image data by means of a display in different ways. The received image data can also be processed and prepared for display here in various ways before their display. The processed image data can also be displayed in various ways, i.e., by means of various display layouts. The type of the image data processing (such as the selection of the imaging mode) and the selection of the display layout are generally predefined and/or can be set individually by a user to make relevant image contents visible as well as possible.

The number of the selectable image data processing types or imaging modes and the number of the selectable display layouts and the number of the combination options resulting therefrom is often very high and so diverse that the correct setting of a desired visualization mode made up of image data processing and display layout is often very complex for the user. At the same time, in particular in medical applications, there is generally only a limited time frame available for the selection of a suitable visualization mode.

The functional scope, in particular the manual setting options for different types of image visualization, thus increases more and more in particular in medical visualization systems. The hazard exists here that the user will be overloaded by the variety of setting options and therefore in practice no longer sets the type of the image visualization which is actually best suitable for their application. In other words, the possibilities for modification of the image displayed on the monitor have often become so diverse that the correct setting of a desired display is often too complex and in practice is therefore no longer comprehensible for the user. Moreover, valuable time is lost by performing numerous manual settings, which is then no longer available for the actual use of the visualization system, for example, in the context of a medical intervention. The specific usage of the visualization system is therefore slowed and thus becomes inefficient. However, this is critical in particular in medical interventions, where work typically has to be performed under time pressure.

SUMMARY

The present invention is therefore based on the object of simplifying the process of selecting the desired visualization mode, in particular simplifying and accelerating the method of the type mentioned at the outset and the operation of the visualization system of the type mentioned at the outset. In particular the usage properties of a medical visualization system as mentioned at the outset are thus to be improved. The invention seeks here to simplify the process of the application-specific image visualization.

To achieve this object, a method for displaying image data is provided, the method comprising: receiving the image data; displaying, by means of a display device, the received image data in a first visualization mode of a predefined sequence of different visualization modes, wherein the first visualization mode is based on a first parameter set of a multidimensional parameter space of visualization parameters; in reaction to the reception of a user input, determining a second parameter set of the multidimensional parameter space for a second visualization mode of the predefined sequence of visualization modes; changing from the first visualization mode to the second visualization mode based on the determined second parameter set.

A "visualization mode" can be understood here in particular as a specific type of the visualization of the image data recorded using an image sensor of the visualization system, thus a specific visualization mode.

In contrast, the "selected sequence" as described herein can be understood as a specific defined sequence of such different visualization modes.

A "visualization mode" (which may be understood as a certain "view mode") comprises a specific imaging mode and at least one associated display layout.

An "imaging mode" can be based on a specific image signal processing method. An "imaging mode" in the meaning of the invention can thus be a specific type of the generation of the image data (based on respective data processing of raw signals of the image sensor used for imaging), in particular a specific image signal processing method. Possible examples of such different image signal processing methods are: fluorescence imaging by means of false colors, either alone or in combination with simultaneous white light imaging; different false color representations of the image data; different contrast representations of the image data; or different types of white light imaging.

Such an "imaging mode" can also be based, for example, on a complex algorithm, which sensorially processes color ratios detected using the image sensor and calculates additional information therefrom, for example, the spatial distribution of an oxygen saturation, and makes it available for visualization (in the meaning of advanced imaging). The respective image signal processing method can also be based, for example, on the selective processing of image data which are based on a subspectrum of an illumination light spectrum used as a whole for imaging (subspectral image processing method). The imaging modes can also be based on different image signal processing algorithms, which are oriented towards the visualization of specific optical markers or specific fluorophores.

In addition to white light image data, in at least one "imaging mode" of the respective stored sequence, in particular the presently selected sequence, at least one item of additional image information, preferably in false color imaging (for example, visualization of invisible IR interference light in a false color scale from yellow to dark blue, depending on the intensity of the IR signal), can thus preferably be visualized with the aid of the at least one "imaging mode" for the user on the display device.

With the aid of the respective "display layout" the image data are visualized on the display device for the user (cf., for example, FIG. 9). A "display layout" in the meaning of the invention can accordingly be understood as a specific layout on the display screen/the display of the display device, in which the image data are presented. Examples of possible display layouts are layouts in "split-screen" or "picture-in-picture" view, or also in superposition (for example, the superposition of a spectral image in false color representation on a white light image). The result of the already processed image content on the display device can thus be adapted by respective change of the display layout, for example, as a full-screen layout, as a divided layout, as a picture-in-picture layout, or as a split-screen layout. In addition, zoom layouts and detail enlargements of image sections can also be implemented as the display layout.

This method can be profitably used in a medical visualization system, which comprises a large number of different visualization modes.

The approach according to the invention has the advantage here that the operation of the visualization system becomes significantly more intuitive and thus easier or faster. This is because the visualization modes proposed by the system, which can be based on different imaging modes, result in a focus on the visualizations of the image data which are essential for the present application and are used most frequently by the user and thus enable accelerated access to these preferred visualizations. The invention thus enables the user to be able to change back and forth rapidly between different visualizations of the image data, wherein the change can be achieved by a simple user input without complex navigation in submenus, in particular because the precise sequence of visualization modes selectable by means of the user input is predefined by the selected sequence and thus limited to a reasonable subset.

It can thus in particular be characteristic for the invention that the user, as soon as they have selected the current sequence, can change back and forth quickly and easily, in particular by a preferably manual user input, between the different visualization modes of the presently selected but predefined sequence. The different visualization modes of the selected sequence can differ here in the imaging mode used and/or in the display layout used, to thus enable diverse visualizations of the image data. Within a sequence made up of different visualization modes, the user can, for example, change very easily by pressing the "input means 8" (such as switches or buttons preferably arranged on the camera head of the visualization system) between different imaging modes and/or different display layouts, depending on the selected visualization mode of the sequence.

The visualization system can in this case have a high number (>100, >150, or even >200) of different visualization modes which are fundamentally available in order to visualize image data recorded using the visualization system, more precisely using an image sensor of the visualization system, on the display device. However, according to the invention, only a limited subset of the setting options existing as a whole is always to be offered to the user of the visualization system, namely on the basis of the presently selected sequence of predefined visualization modes. That is to say, only a specific selection of visualization modes (tailored for the application presently carried out and) selectable at all by means of a user input, in particular different selectable imaging modes, is always offered to the user, which the user can then select by actuating an input means. The different visualization modes and/or imaging modes comprised in the presently selected sequence facilitate the medical diagnosis on the basis of the live image for the user; they also help the user to orient themselves within the respective application, thus depending on the situation to select a best possible visualization of the image contents on the display device.

Each of the visualization modes of the predefined sequence of different visualization modes can be based on a different corresponding parameter set in each case. In other words, each of the visualization modes corresponds to (or represents or is based on) one point or vector, in particular one different point or vector, in the multidimensional parameter space. In still other words, each of the visualization modes is based on a respective parameter set made up of multiple visualization parameters independent of one another. The different visualization modes within one of the sequences stored in the memory of the visualization system can thus differ in: i) the "imaging mode" of the respective visualization mode used to process the image signals of the image sensor of the visualization system, and/or ii) the display layout used to visualize the image data in the respective visualization mode. The sequence preferably comprises multiple display layouts here, in which an identical "imaging mode" can be visualized.

The image data are, for example, medical image data, in particular image data recorded by means of a camera or video endoscope.

The user input can be carried out, for example, by actuating a suitable input means, for example, a spring trigger, actuating button, and/or foot switch. The actuating button can be located within reach of a user, for example, on the camera or the video endoscope.

The sequence of visualization modes can be preset and/or changeable at the factory or by the user. The sequence preferably specifies a change sequence of the visualization modes.

The mentioned method has the advantage that a limited number of visualization modes is offered to the user, between which it is possible to change intuitively and easily, without, for example, a respective selection having to be made in a hierarchical menu or a respective key assignment having to be used for different modes for this purpose. In this way, the change to a visualization mode suitable according to user preference, application, and/or image data content is facilitated and accelerated.

In one embodiment, it is provided that the second visualization mode directly precedes or directly follows the first visualization mode in the predefined sequence and/or that the change from the first visualization mode to the one or to multiple second visualization modes takes place step-by-step in reaction to each first user input, preferably in an order predetermined by the sequence.

In this way, a particularly intuitive and efficient change between the modes of the sequence is provided. The change from the first to the second visualization mode can be achieved here via different input means and/or via different actuations, for example, actuations of different lengths, of the input means in each case, in particular depending on whether a preceding or following mode is to be selected.

In one embodiment, it is provided that the visualization modes each comprise a combination made up of one or more imaging modes of the received image data, which are preferably each based on different processing of the received image data, and one or more display layouts of the display device.

The various imaging modes comprise, for example, false color representations, contrast representations, fluorescence representations, white light representations, representations to display oxygen saturations, and/or the representation of image data processed by means of other, in particular spectral processing methods.

Additionally or alternatively, the one or more imaging modes of the received image data can each be based on a different part of the received image data, for example, on a different spectral range in each case.

The one or more display layouts, also called display types, can comprise multiple representations of the image data, in particular of image data each displayed in different imaging modes, in different areas of the display device in each case. For example, the display layouts can comprise a full-screen layout, divided layouts, superimposed layouts, picture-in-picture layout, split-screen layout, zoom layouts, and/or detail enlargement layout.

In this way, the user can select a suitable visualization mode, for example, depending on user preference, area of application, and/or image data content, in a simple and effective manner.

In one embodiment, it is provided that the visualization modes comprised by the sequence of different visualization modes is a subset of a number of settable visualization modes.

In other words, the visualization modes comprised by the sequence are based on a (or represent a) subset of definable parameter sets or points or vectors of the multidimensional parameter space.

In this way, only a limited number of visualization modes, in particular specific to the application, are presented to the user, which further simplifies and accelerates the method for displaying the image data, in particular for selecting the matching visualization mode.

In one embodiment, it is provided that the user input is a first user input, the method further comprising: defining or changing the predefined sequence of different visualization modes based on a second user input, stored user preferences, a specific visualization system parameter and/or application parameter, and/or the received image data.

For example, the composition of the sequence, i.e., the modes contained therein and their order, can be determined and/or changed. The determination and/or changing can be carried out manually by the user by a corresponding user input. Additionally or alternatively, the determination and/or changing can take place automatically according to stored user preferences, for example, based on last used visualization modes. The determination and/or changing can also take place automatically on the basis of system and/or application parameters and/or the received image data, for example, by the detection of specific system components, such as light sources and cameras, or the area of application, which is settable or determined on the basis of the received image data, for example. The use of self-learning software (machine learning) for automatically determining and/or changing the predefined sequence is also conceivable.

In one embodiment, it is provided that the method further comprises: determining the predefined sequence of different visualization modes based on a plurality of predefined sequences of visualization modes.

In this way, for example, multiple sequences can be predefined and provided, in particular stored, for multiple known system compositions and/or known areas of application, from which a corresponding sequence can be selected depending on the determined system composition, user preference, and/or determined area of application. The user can then change easily between the multiple predefined sequences, i.e., exchange the sequence, which further accelerates and simplifies the change between application-related visualization modes.

In one embodiment, it is provided that the method further comprises: in reaction to the or a second user input, changing the imaging mode, the display layout, and/or individual parameters of at least one of the visualization modes of the sequence of visualization modes, in particular the first and/or second visualization mode.

The parameters of a parameter set can in particular comprise parameters of the imaging mode or the display layout. In this way, the setting for the selected visualization mode can be adapted after selecting one of the visualization modes of the sequence. This permits a fine adjustment of the visualization mode based on individual requirements, without newly selecting or exchanging entire modes or sequences.

In one embodiment, it is provided that the display of the received image data in the first visualization mode further comprises: displaying a preview of the received image data in one or more further visualization modes of the predefined sequence, in particular all visualization modes of the predefined sequence, of the directly preceding and/or directly following visualization mode of the sequence.

For example, the received data are displayed in the one of the further visualization modes, for example, the second visualization mode, as a picture-in-picture preview together with the received data in the first visualization mode. In this way, the overview of the modes contained in the sequence and the handling by the user are improved.

As a further possible independent aspect, a visualization system for representing image data is provided, the visualization system comprising an imaging device for receiving image data; a display device for displaying the received image data; an input means for receiving a user input; and a computer device comprising means for executing the above-described method or one of the above-described methods.

As a further possible independent aspect, a computer-readable storage medium is provided, the computer-readable storage medium comprising commands which, upon the execution by a computer, prompt it to carry out the above-described method or one of the above-described methods.

The invention is described in more detail hereinafter on the basis of several preferred abstract implementations and then on the basis of specific exemplary embodiments.

The invention can be implemented, for example, in an abstract manner as follows as a specific method or as a specific system.

Implementation 1) of the invention: a method for displaying image data, the method comprising: receiving (110) the image data; displaying (120), by means of a display device (5), the received image data in a first visualization mode of a predefined sequence (a-g) of different visualization modes, wherein the first visualization mode is based on a first parameter set of a multidimensional parameter space of visualization parameters; in reaction to the reception (130) of a user input, determining (140) a second parameter set of the multidimensional parameter space for a second visualization mode of the predefined sequence of visualization modes; changing (150) from the first visualization mode to the second visualization mode based on the determined second parameter set.

The method as provided in implementation 1), wherein the second visualization mode directly proceeds or directly follows the first visualization mode in the predefined sequence and/or wherein the change from the first visualization mode to one or more second visualization modes takes place step-by-step in response to each first user input, preferably in an order predetermined by the sequence.

The method as provided in any one of the preceding implementations, wherein the visualization modes each comprise a combination of one or more imaging modes of the received image data, which are preferably each based on different processing of the received image data, and one or more display layouts of the display device.

The method as provided in any one of the preceding implementations, wherein the visualization modes comprised by the sequence of different visualization modes are a subset of a number of settable visualization modes.

The method as provided in any one of the preceding implementations, wherein the user input is a first user input, the method further comprising: determining or changing the predefined sequence of different visualization modes based on a second user input, stored user preferences, a specific system parameter and/or application parameter, and/or the received image data.

The method as provided in any one of the preceding implementations, further comprising: determining the predefined sequence of different visualization modes based on a plurality of predefined sequences of visualization modes.

The method as provided in any one of the preceding implementations, further comprising: in reaction to the or a second user input, changing the imaging mode, the display layout, and/or individual parameters of at least one of the visualization modes of the sequence of visualization modes, in particular the first and/or second visualization mode.

The method as provided in any one of the preceding implementations, wherein the display of the received image data in the first visualization mode further comprises: displaying a preview of the received image data in one or more further visualization modes of the predefined sequence, in particular all visualization modes of the predefined sequence, of the directly preceding and/or the directly following visualization mode of the sequence.

The invention can also be abstractly implemented by the following system: a system for representing image data, the system comprising: an imaging device for receiving image data; a display device for displaying the received image data; an input means for receiving a user input; and a computer device comprising means for executing a method as claimed in any one of the above-described implementations.

And finally, the invention can also be implemented with the aid of a computer-readable storage medium, which comprises commands which, upon the execution by a computer, prompt it to carry out a method as claimed in any one of the above-explained implementations.

BRIEF DESCRIPTION OF THE DRAWINGS

Specific embodiments of the invention are illustrated in the figures. In the schematic figures:

FIG. 2 shows a plurality of sequences of visualization modes comprising a plurality of different imaging modes.

DETAILED DESCRIPTION

Figure 1:
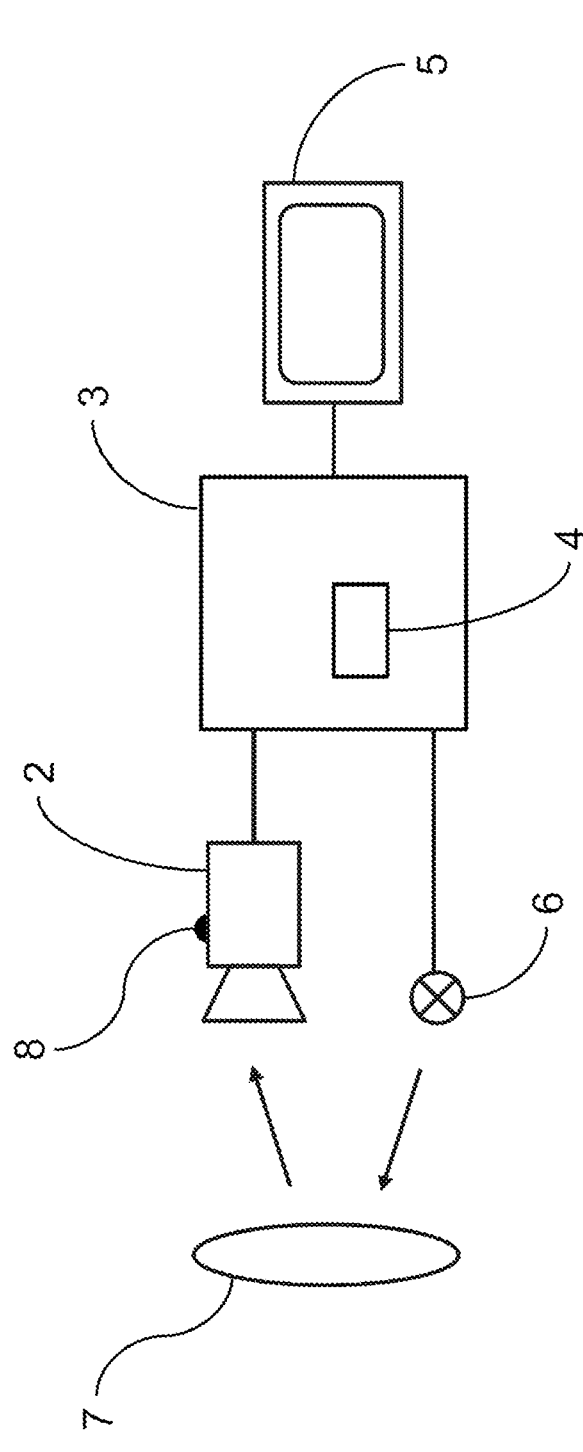
FIG. 1 shows a visualization system for displaying image data.

FIG. 1 shows a visualization system 1 for displaying image data. The visualization system 1 comprises a camera 2, a computer device 3, a switchover device 4 comprised by the computer device 3, a display device 5, a light source 6, an object 7 detected by the camera 2, and an input means 8 attached to the camera 2.

Figure 10:
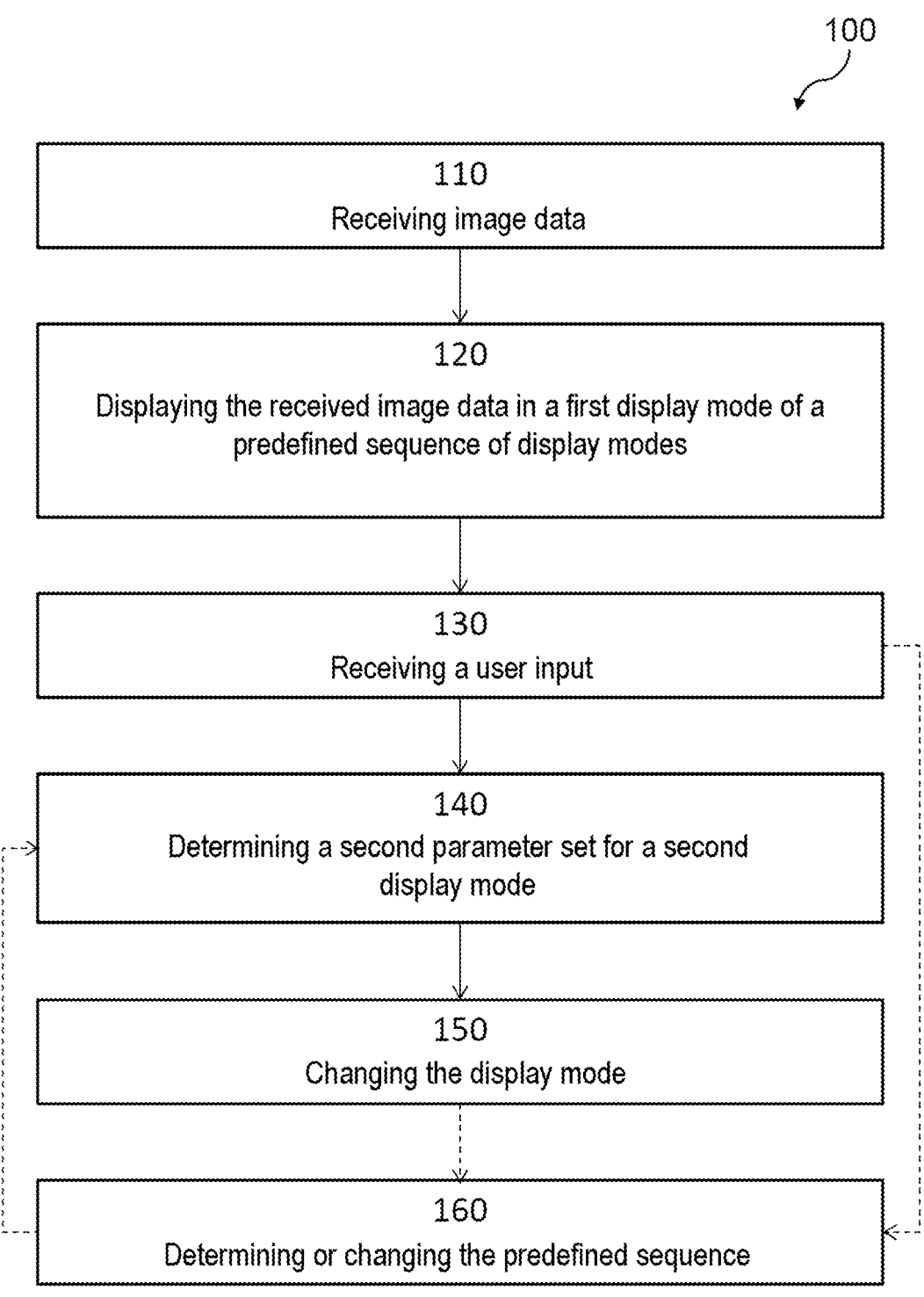
FIG. 10 shows a flow chart of a method for displaying image data.

FIG. 10 shows a flow chart of a method 100 for displaying image data. Reference will be made to the individual method steps of the method 100 at a suitable point.

The object 7 illustrated in FIG. 1 is irradiated in the visualization system 1 shown by means of the light source 6. The light source 6 can irradiate the object 7 by means of white light and/or light of various, in particular specific individual spectral ranges. The camera 2, for example a video endoscope, detects the object 7 and generates associated image data. The image data are forwarded to the computer device 3 and received thereby in step 110 of the method 100. The received image data are represented in method step 120 of the method 100 by means of the display device 5 in a first, currently selected visualization mode.

This currently selected visualization mode is associated here with a currently selected sequence, which the user has previously selected and which is stored in a memory of the visualization system 1, in addition to further different such sequences. The respective sequence (thus in particular the presently selected sequence) defines here which visualization modes and therefore imaging modes and/or display layouts are presently offered to the user for selection. The total number of possible modes which the visualization system 1 offers is very much higher here than the presently possible selection, which significantly simplifies the operation. This is because although the visualization system 1 offers extremely complex modes for numerous different applications, the use of the visualization system 1 remains simple and therefore practical in the respective application, and does so particularly for medical applications, where time pressure often is critical.

In reaction to a user input, which is received by the computer device 3, in particular the switchover device 4, in method step 130 of the method 100, the switchover device 4, in method step 150 of the method 100, prompts the change from the currently selected first visualization mode to a second visualization mode of the selected sequence. Based on the change of the currently selected visualization mode, the image data received in method step 110 are subsequently represented by means of the display device 5 in the second visualization mode. The user input can be made by a user by means of actuation of the input means 8. This input means 8 can be designed, as explained, as a manual input means; however, for example, an input means 8 which can receive and evaluate speech commands of the user ("Change visualization mode!"), thus an acoustic input means, would also be technically equivalent.

The change from the first visualization mode to the second visualization mode and to each further following visualization mode takes place step-by-step.

FIG. 2 shows a plurality of first sequences a-g of visualization modes, which each comprise different imaging modes A-E. A sequence of visualization modes comprises, for example, multiple imaging modes A-E, in which the received image data are displayed in different ways. For example, different parts or subsets of the image data are each represented in various imaging modes. Additionally or alternatively, differently processed image data are each represented in different imaging modes.

The multiple sequences a to g of visualization modes each comprise a white light representation (WLI, imaging mode A) in the example shown and one or more spectral representations of the image data (imaging modes B to E). The different spectral images can be based, for example, on different processing or filtering of the received image data and/or can have been recorded by means of different spectral illumination by the light source 6.

Figure 3:
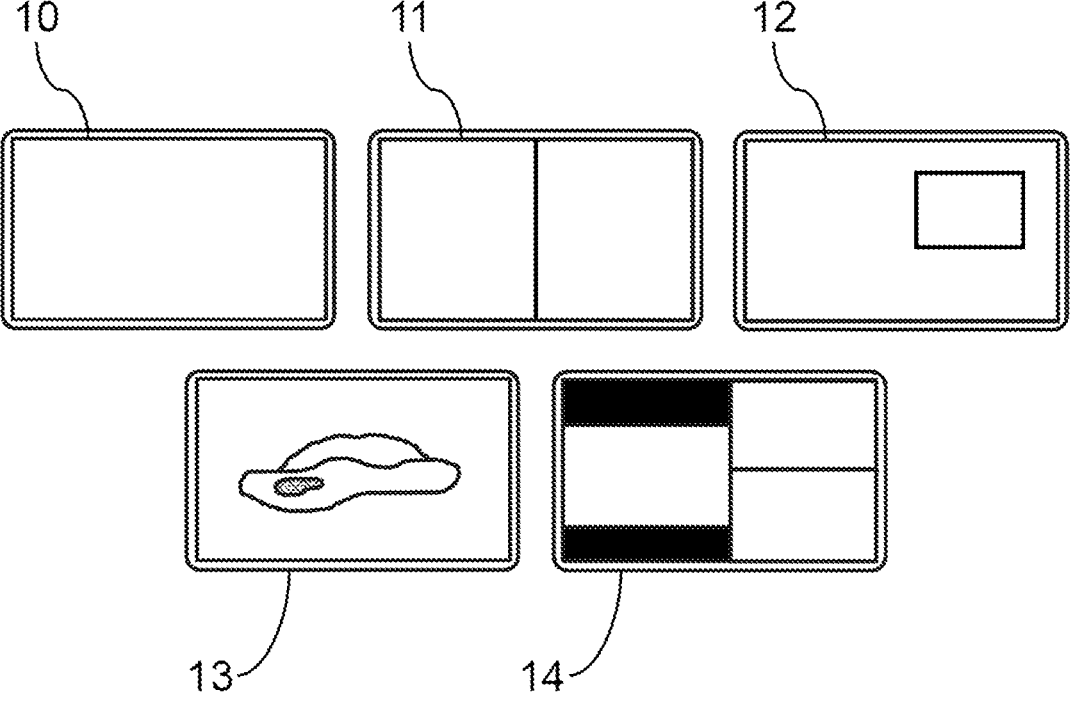
FIG. 3 shows multiple display layouts which can be combined with one or more of the plurality of imaging modes to form respective visualization modes.

FIG. 3 shows various display layouts 10-14. The different display layouts comprise different display layouts of the image data received in method step 110. In the display layout 10, the received image data are displayed in the full image layout (full-screen mode). In the display layout 11, the image data are displayed in a split-screen layout. In the display layout 12, the image data are displayed in a picture-in-picture layout. In the display layout 13, the image data are displayed in a superposition layout. In the display layout 14, the image data are displayed in a picture-out-of-picture layout. Further display layouts are conceivable, for example, zoom layouts and/or detail enlargement layouts. The same, different parts or subsets, and/or differently processed image data can be used, for example, for the respective windows and/or areas of the display layouts.

A combination of one or more of the imaging modes described with reference to FIG. 2 with one of the display layouts described with reference to FIG. 3 represents a visualization mode. For example, a white light representation (imaging mode A) in full-screen layout (display layout 10) can be selectable as the first visualization mode. Furthermore, a white light representation (imaging mode A) and a first fluorescence representation (imaging mode B) in a superposition layout (display layout 13) can be selectable as the second visualization mode.

The individual imaging modes, which are different, for example, depending on the area of application or system components used, can predetermine the display layouts used, and thus the available visualization modes. For example, a full-screen display layout 10 is only used in combination with a WLI representation (imaging mode A). Furthermore, for example, a spectral representation (imaging modes B to E) is only displayed by means of one or more of the display layouts 11-14. In other words, display layouts and/or visualization modes of a sequence can be determined or selected based on determined, selected, and/or available imaging modes.

By actuating the input means 8, it is possible to change between the individual visualization modes of a sequence of visualization modes step-by-step.

Figure 4:
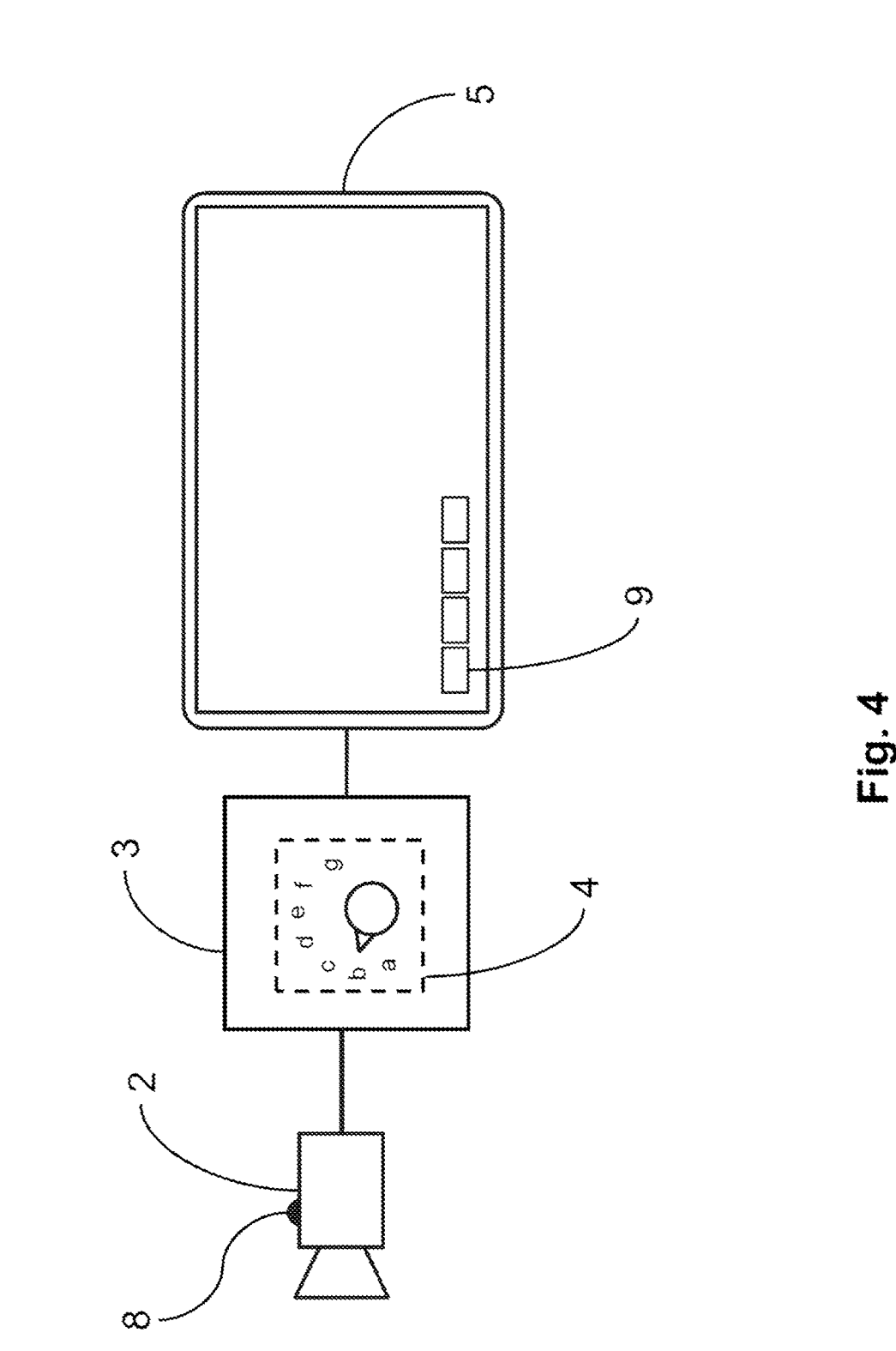
FIG. 4 shows individual components of the visualization system 1, partially in a detailed representation, in which a sequence b of visualization modes is selected.

FIG. 4 shows the visualization system 1 from FIG. 1 without the light source 6 and the detected object 7. As illustrated in FIG. 4, it is possible to use different sequences a-g of visualization modes. The different sequences can be stored, for example, in a memory of the computer device 3 and can be individually selectable or activatable. In other words, the sequence of visualization modes is a sequence selected from different, in particular stored sequences of visualization modes. Additionally or alternatively, the sequence of visualization modes is a sequence determined based on a selection of different visualization modes (or parameter sets). In the example shown in FIG. 4, sequence b is selected.

The selection of a sequence from a plurality of sequences and/or different visualization modes for a sequence can be carried out by the user of the visualization system 1 or during manufacturing of the visualization system 1 at the factory. Additionally or alternatively, as described in method step 160 of the method 100, a predefined sequence can be determined or changed.

The determination or the changing of the predefined sequence can comprise the change from one predefined sequence to another predefined sequence. Additionally or alternatively, the determination or the changing of the predefined sequence can comprise the exchange of individual imaging modes and/or display layouts and/or the determination or change of the order of individual visualization modes within the sequence. Additionally or alternatively, the changing of the predefined sequence can comprise the changing of a parameter set associated with a visualization mode. In other words, parameters or settings of a visualization mode can be finely adjusted.

The determination, changing, and/or pre-definition of sequences of visualization modes can take place at the beginning of the method 100 or during the method 100, for example in method step 160, but also at any other point of the method. As described above, this can be carried out by the user of the visualization system 1 (as well as the determination of the initially selected first visualization mode). Additionally or alternatively, this can be carried out by the computer device 3.

The user, or the computer device 3 itself, can determine, i.e., define, change, and/or predefine, one or more sequences of visualization modes, for example, based on the system components used (thus, for example, the camera 2 and/or the light source 6 and/or the display device 5). Therefore, for example, depending on the system components used, reasonable visualization modes and sequences of visualization modes can in particular be determined in an automated manner by the visualization system 1.

Additionally or alternatively, one or more sequences of visualization modes can be determined, changed, and/or predefined on the basis of visualization modes used often and/or last, wherein this can also be carried out by the user or by the computer device 3.

Additionally or alternatively, one or more sequences of visualization modes can be determined, changed, and/or predefined on the basis of a determined or selected application, for example, based on the determination or selection of one of multiple medical applications, such as carrying out different endoscopic methods in particular.

If one or more sequences are determined by the visualization system 1 itself or by the computer device 3, a correspondingly trained artificial intelligence or a machine learning algorithm can be used. The determination of one or more sequences by the visualization system 1 or the computer device 3 can be based here in particular on the received image data.

Due to such an intelligent and automated adaptation of the predefined sequences stored in the memory of the visualization system 1 to different visualization modes, a matching subselection of possible presently selectable visualization modes can always be offered to the user in different application situations, in particular without the user having to perform the adaptation of the sequence themselves here. This facilitates the operation, because the visualization system 1 takes away a majority of the otherwise required manual settings of the respective visualization mode from the user.

The method according to the invention can thus in particular provide an automatic change of the presently selected sequence (and thus the presently selected visualization mode (=imaging mode+display layout)), specifically:

i) on the basis of presently used or presently exchanged system components, ii) on the basis of visualization modes used often and/or last, iii) based on a selection from multiple medical applications by the user, and/or iv) using an artificial intelligence (AI), which analyzes the received image data and derives a recommendation for matching selectable visualization modes therefrom.

However, a user can also store their own sequences designed according to their taste of respective different visualization modes in the memory. A user interface in the visualization system 1 can also be designed for this purpose, which enables a definition of the sequence by means of a graphic user interface easily and quickly. Such a stored sequence can then be retrieved by the user, for example, upon starting the visualization system 1. This permits a rapid and easy user-specific operation of the visualization system 1 during the actual following use.

According to the invention, multiple different sequences of different visualization modes in each case can thus always be stored in the memory. The individual parameters of a visualization mode stored in the memory (as part of one or more of the stored sequences) can also be designed as manually changeable, so that a user can adapt the respective parameters of the respective visualization mode by setting again and storing.

In the context of a particularly comfortable quick access, as a further possible option for the embodiment of the method according to the invention, it can also be provided that the user selects the imaging mode to be applied in a first selection step, selects the visualization mode to be applied in a second (preceding or following) selection step, and finally finely adjusts individual parameters of the imaging mode in a third selection step. By means of such a quick access, a presently selected sequence of visualization modes can thus be adapted very quickly to the needs of the user; only three successive user inputs are required for this purpose.

The image data received in method step 110 are displayed in the example shown in FIG. 4 in a first visualization mode of the sequence b by means of the display device 5. By actuating the input means 8, it is possible to change from the first visualization mode to a second visualization mode of the sequence b. By way of the subsequent reception of a further user input, it is possible to change from the selected visualization mode, the second visualization mode here, to the following visualization mode of the sequence b.

As described, it is possible to change between the visualization modes of the sequence by actuating the input means 8. In particular, it is possible to change step-by-step from one visualization mode of the sequence to another visualization mode of the sequence, wherein preferably each actuation of the input means 8 results in a change to a next or following visualization mode defined by the sequence. In other words, the sequence specifies the order in which the visualization modes can be selected. It is possible to run through the sequence of visualization modes in the described manner. It is possible to change from the end of the sequence to the beginning of the sequence. Alternatively or additionally, it is possible to run through the sequence of visualization modes in reverse. For example, the change from one visualization mode to a following visualization mode can be achieved by a first, for example single actuation of the input means 8. The change from one visualization mode to a preceding visualization mode can then be achieved by a second, for example doubled or longer actuation of the input means 8.

The input means 8 is attached to the camera 2 in the example shown. However, the input means 8 can also be attached anywhere in the visualization system 1, as long as the input means 8 has a communication connection (wireless or wired) to the computer device 3, in particular the switchover device 4. The input means 8 is preferably attached within reach of the user of the visualization system 1, thus in particular in the area of a camera head of the visualization system 1.

As shown in FIG. 4, multiple previews 9 are displayed by means of the display device 5. The previews 9 show image data received in method step 110 in non-selected, in particular different visualization modes. For example, the previews 9 display the same image data—which are displayed in the presently selected first visualization mode—in other visualization modes. Each of the previews 9 can display a respective different one of the non-selected visualization modes. The previews 9 are displayed in the example shown as picture-in-picture layouts using the image data displayed in the selected visualization mode. Additionally or alternatively, the previews 9 can also comprise a preview, in particular identified as such or highlighted, of the image data in the presently selected visualization mode. It is also conceivable that the previews 9 only comprise the visualization mode directly preceding and/or directly following the presently selected visualization mode.

The previews 9 are shown in the order (from left to right in the example shown) as they can be selected step-by-step starting from the presently selected visualization mode by means of actuation of the input means 8.

One parameter set of visualization parameters in a multidimensional parameter space is assignable to each of the multiple visualization modes. The multidimensional parameter space is spanned by a plurality of independent parameter areas. A point or vector in the parameter space represents a set of specific parameters or parameter values.

The above-described change of the visualization mode from the first to a next, second visualization mode in method step 150 of the method 100 is preceded in method step 140 by the determination of a corresponding second parameter set for the second visualization mode. In other words, in response to the reception of the user input in method step 130, which is directed to a change from a currently selected visualization mode to a next visualization mode of the sequence of visualization modes, the computer device 3, in particular the switchover device 4, determines a parameter set associated with the second visualization mode. Additionally or alternatively, the computer device 3 can determine a change of the parameters of the parameter set from the first parameter set to the second parameter set. In other words, method step 140 of the method 100 can comprise the determination of a vector from the first parameter set to the second parameter set in the parameter space. In still other words, in response to the reception of the user input in method step 130, the computer device 3 or the switchover device 4 determines the way in which the currently selected parameters have to be changed to reach that parameter set which represents the second visualization mode of the sequence of visualization modes.

Figure 5:
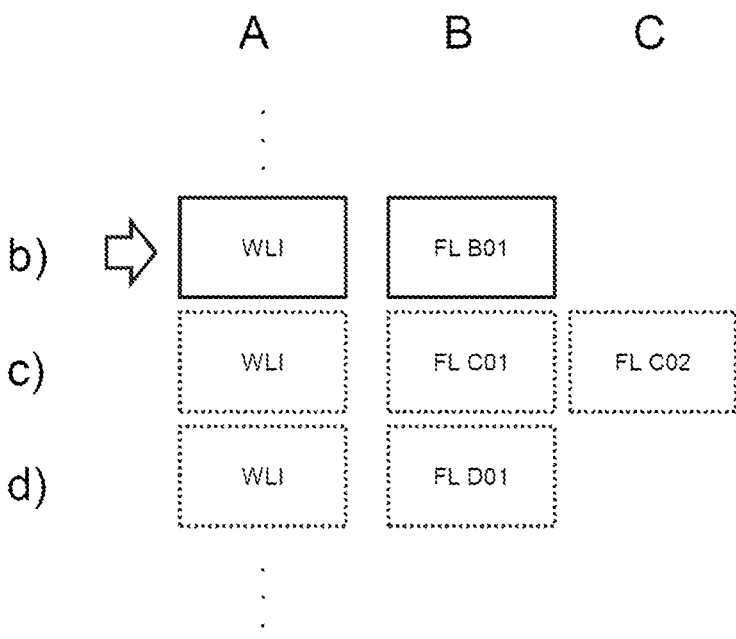
FIG. 5 shows a first detail from the plurality of sequences of visualization modes shown in FIG. 2, wherein the sequence b is highlighted.

As illustrated in FIGS. 2 and 5, the sequence b comprises imaging modes: a white light representation A and a first fluorescence representation B (here FL B01). The sequence b further comprises possible display layouts: the full-screen display layout 10-1 illustrated in FIG. 6, the superposition display layout 13-1, the split-screen display layout 11-1, and the picture-in-picture display layout 12-1. The combination of the imaging modes of the sequence b shown in FIG. 5 with the display layouts of the sequence b shown in FIG. 6 results in the visualization modes of sequence b, which are also shown in FIG. 6.

The combinations made up of imaging modes and display layouts can be determined based on the imaging modes. In particular, one or more imaging modes can be used in each visualization mode. For example, in each selectable visualization mode, a white light representation (imaging mode A) is used as the basic and/or reference representation.

Figure 6:
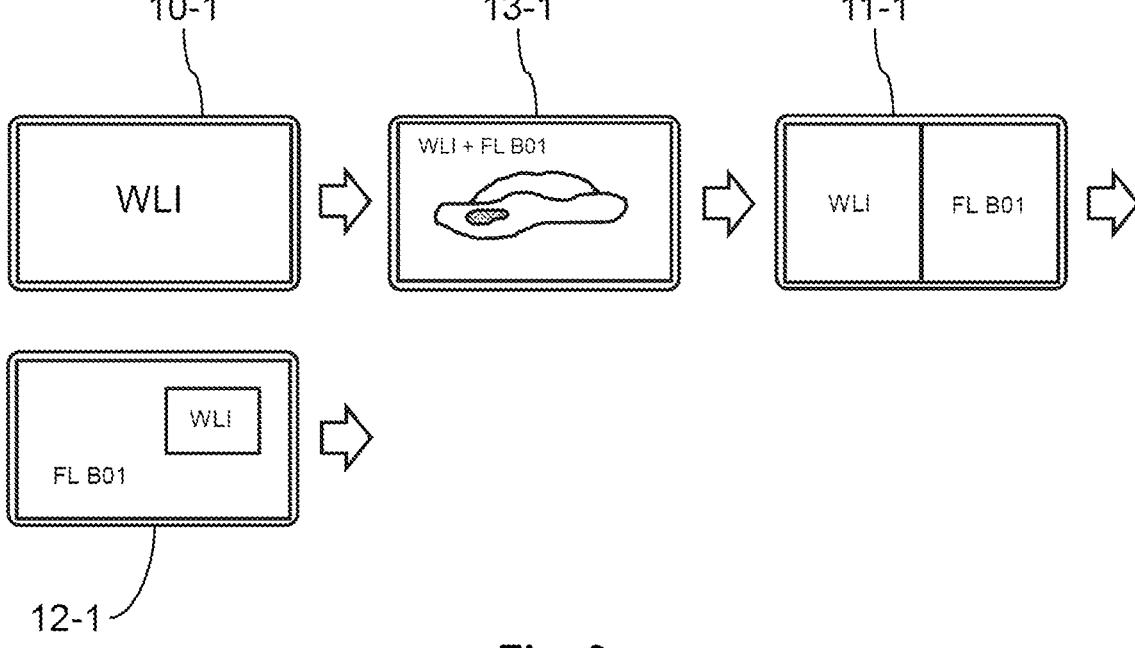
FIG. 6 shows a number of visualization modes of the sequence b comprising a selection of the multiple display layouts in combination with the multiple imaging modes of the sequence b.

It is possible to change between the individual visualization modes of the sequence b shown in FIG. 6 via actuation of the input means 8 in the order indicated by the arrows in FIG. 6, wherein it is possible to change from the last mode to the first mode.

Figure 7:
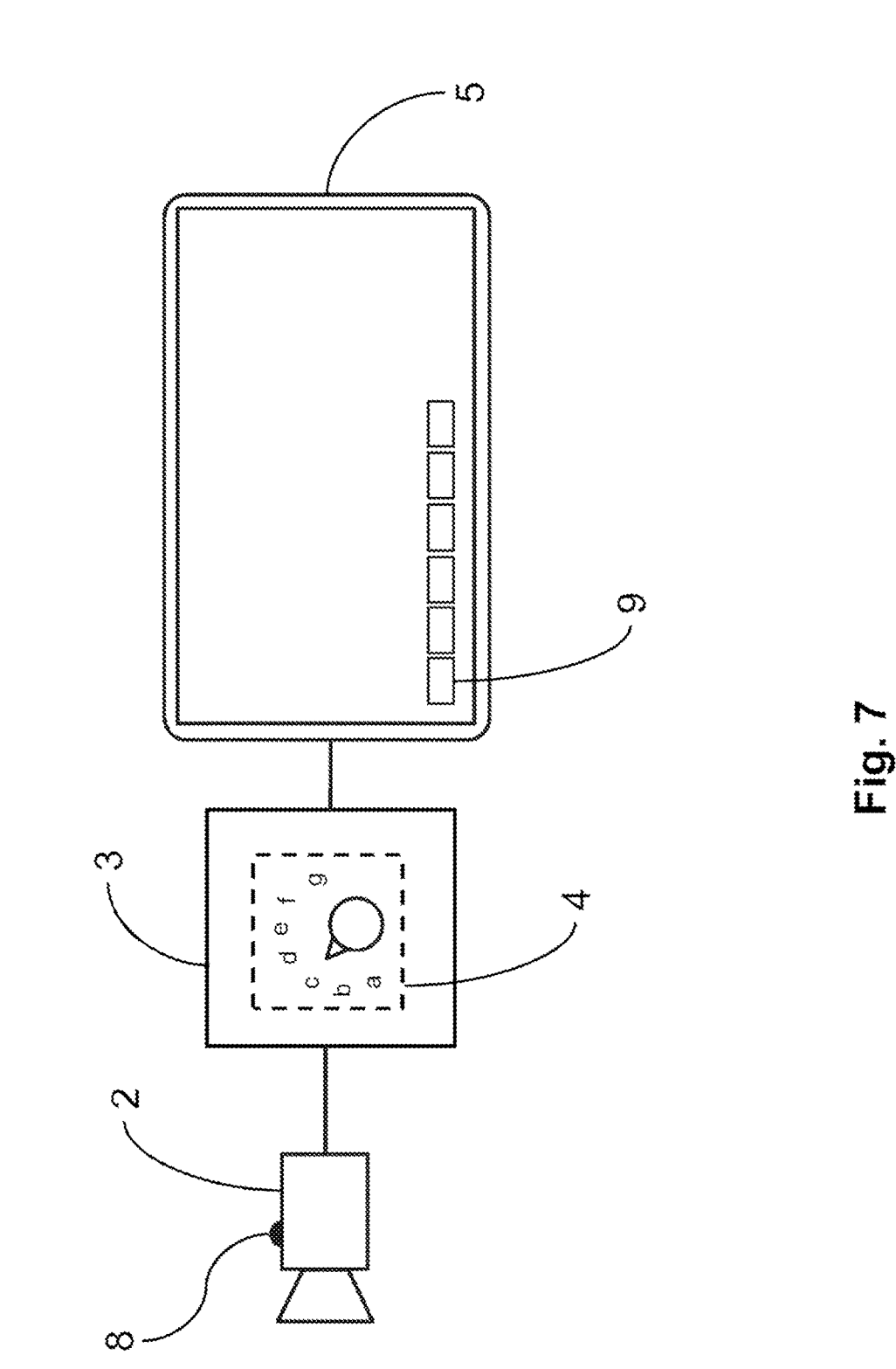
FIG. 7 shows individual components of the visualization system 1, partially in a detailed representation, in which a sequence c of visualization modes is selected.

FIG. 7 shows the visualization system 1 from FIG. 1 without the light source 6 and the detected object 7. In the example shown in FIG. 7, sequence c is selected. Identical or similar features are provided with identical reference signs.

Figure 8:
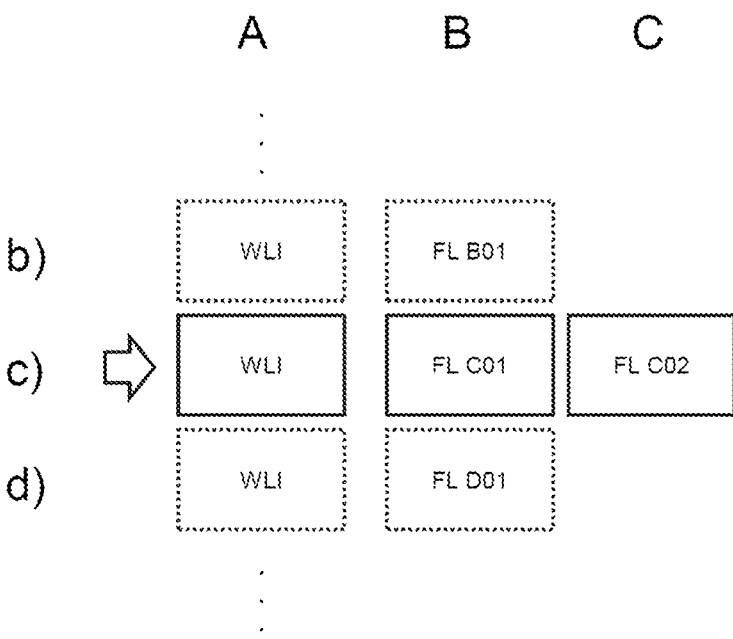
FIG. 8 shows a second detail from the plurality of sequences of visualization modes shown in FIG. 2, wherein the sequence c is highlighted.

As shown in FIGS. 2 and 8, the sequence c comprises as representation modes a white light representation (imaging mode A) and two fluorescence representations (imaging modes B and C, here FL C01 and FL C02, which can be identical to or different from the fluorescence representation FL B01).

Figure 9:
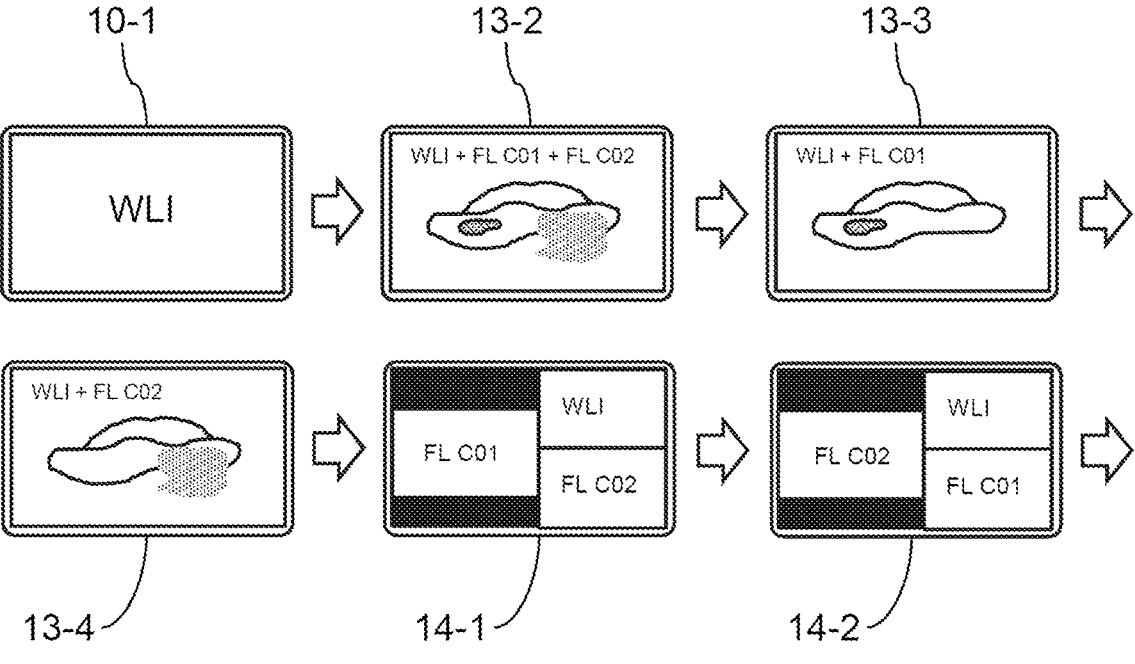
FIG. 9 shows a number of visualization modes of the sequence c comprising a selection of the multiple display layouts in combination with the multiple imaging modes of the sequence c.

As illustrated in FIG. 9, the received image data are displayed in a first visualization mode of the sequence c as a white light image in the full image mode (display layout 10-1). In multiple second visualization modes of the sequence b, the received image data are displayed in different superimposed display layouts 13-2 to 13-4 in each case, wherein the image data are displayed in the different display layouts in different imaging modes (partially in white light representation and partially in different spectral representations here), wherein the white light representation is used in each case as the basic or reference representation. In multiple third visualization modes of the sequence c, in turn, the received image data are displayed in split-screen layouts

14-1 to 14-2, wherein the image data are displayed in different imaging modes (partially in white light representation and partially in different spectral representations here) in the individual images of the split-screen layouts, in particular wherein the white light representation is used in each case as the basic or reference representation.

As is further illustrated in FIG. 9 by the arrows between the visualization modes, it is also possible to change step-by-step between the visualization modes of the sequence c in the sequence of visualization modes shown here by actuating the input means 8.

As a comparison of FIGS. 6 and 9 shows, a greater number of available imaging modes can result in a greater number of available visualization modes of a sequence (and vice versa), in particular if the display layouts used (and thus the available combinations made up of imaging modes and display layouts) are determined or selected based on the available imaging modes.

Overall, a sequence of a limited number of visualization modes can thus be determined, in particular predefined. Based on the sequence, it is possible to change between the individual visualization modes step-by-step in the order predetermined by the sequence in a simple, intuitive, and effective manner.

The sequence of visualization modes comprises a number of visualization modes. The number of visualization modes represents a subset of available or selectable visualization modes. The method or the visualization system 1 therefore provides a possibility of determining a limited number of visualization modes comprised by the sequence, between which it is possible to change easily, from a large, sometimes incomprehensible set of visualization parameters and visualization modes resulting therefrom.

LIST OF REFERENCE SIGNS

1 visualization system for displaying image data
2 camera
3 computer device
4 switchover device
5 display device
6 light source
7 detected object
8 input means
9 preview
10 full-screen display layout
11 split-screen display layout
12 picture-in-picture display layout
13 overlay display layout
14 picture-out-of-picture display layout
100 method for displaying image data

The invention claimed is:

1. A method for visualizing image data on a display device (5) of a medical device visualization system (1) comprising a microscope, an exoscope, or an endoscope, the visualization system (1) comprising:

at least one of a camera (2) or image sensor, which generates live image data to be displayed on the display device (5), wherein various sequences of visualization modes are stored in a memory of a computer device (3) of the visualization system (1), and wherein the different visualization modes of a sequence each comprise a combination made up of:

a respective imaging mode, which is based on a specific image signal processing of the received live image data, and an associated display layout, in which the live image data are presented on the display device, and the method comprises the following steps:

individually selecting by a user, a predefined sequence (a-g) of visualization modes from the stored various sequences of visualization modes, the predefined sequence (a-g) comprising a first and a second visualization mode, receiving (110) the live image data;

displaying (120) the received live image data by the display device (5) in the first visualization mode of the predefined sequence (a-g) of visualization modes, wherein the first visualization mode is based on a first parameter set of a multidimensional parameter space of visualization parameters;

in reaction to receiving (130) a first user input of at least one user input, determining (140) a second parameter set of the multidimensional parameter space for the second visualization mode of the predefined sequence (a-g) of visualization modes; and changing (150) from the first visualization mode to the second visualization mode based on the determined second parameter set;

wherein the second visualization mode differs from the first visualization mode in at least one of the respective imaging mode or the associated display layout.

2. The method according to claim 1, wherein the selected sequence of visualization modes comprises at least one of (i) different imaging modes based on at least one of: a) different processing or filtering of the received live image data or b) recording by different spectral illumination from a light source (6), or (ii) different display layouts including at least one of: a full image layout, a split-screen layout, a picture-in-picture layout, a superposition layout, a picture-out-of-picture layout, a zoom layout, or a detail enlargement layout.

3. The method according to claim 1, wherein at least one of:

the second visualization mode directly precedes or directly follows the first visualization mode in the predefined sequence, or the change from the first visualization mode to the second visualization mode or to multiple second visualization modes of the selected sequence takes place step-by-step in each case in response to the first user input, and does so in an order which is predetermined by the presently selected sequence.

4. The method according to claim 1, wherein the visualization modes comprised by the selected sequence of different visualization modes is a subset of a larger number of overall visualization modes that are settable using the visualization system (1).

5. The method according to claim 1, further comprising:

determining or changing (160) the selected predefined sequence of different visualization modes based on at least one of:

a second user input, stored user preferences, a specific system parameter, application parameter, or the received live image data.

6. The method according to claim 1, wherein the user or the computer device (3) at least one of changes or predefines one or more of the various sequences of visualization modes stored in the memory, to define a plurality of applicable sequences of visualization modes reasonable for a respective application.

7. The method according to claim 1, wherein the different visualization modes of one or more of the sequences of visualization modes stored in the memory are determined or changed by the computer device (3) by using at least one of artificial intelligence or machine learning based on at least one of:

the visualization modes used last by the user, a medical application, or the received live image data.

8. The method according to claim 1, further comprising:

determining (160) the predefined sequence of various visualization modes based on a plurality of predefined various sequences of the different visualization modes which are stored in the memory.

9. The method according to claim 1, further comprising:

in reaction to a second user input, changing at least one of an imaging mode, a display layout, or individual parameters of at least one of the different visualization modes of the selected sequence of visualization modes in response to a second user input.

10. The method according to claim 1, wherein the step of displaying (120) the received live image data in the first visualization mode (a) further comprises:

displaying a preview representation (9) of the received live image data in a further visualization mode or in multiple further visualization modes of the predefined sequence.

11. The method of claim 10, wherein all of the different visualization modes of the predefined selected sequence, or a visualization mode directly preceding or following the first visualization mode are displayed in the preview representation (9).

12. A medical device visualization system (1) comprising a microscope, exoscope, or endoscope for displaying image data, the medical device visualization system (1) comprising:

a camera (2) for generating live image data;

an imaging device (2) for receiving the live image data;

a display device (5) for displaying the received live image data;

an input device (8) for receiving a user input; and a computer (3, 4) configured to carry out the method according to claim 1, the computer including said memory for storing the various sequences of visualization modes, with each visualization mode comprising said specific combination of the imaging mode and the associated display layout, and the selected sequence is stored in the memory and is selectable by the user;

wherein the visualization system (1) is configured, in response to the at least one user input, to make a change in a predefined and currently selected sequence of visualization modes from the first visualization mode of the selected sequence to the second visualization mode of the selected sequence, and to represent the received live image data via the display device (5) based on the change to the second visualization mode of the selected sequence, wherein the user can change step-by-step between the various visualization modes of the currently selected sequence by actuating the input device (8), and wherein the second visualization mode differs from the first visualization mode in the combination of the respective imaging mode and the associated display layout used.

13. The medical device visualization system (1) according to claim 12, wherein the camera is a video endoscope.

14. A non-transitory, computer-readable storage medium, comprising commands, which, upon execution by the computer device (3, 4) of the medical device visualization system (1) according to claim 12, prompt the computer device (3, 4) to carry out the method.

\* \* \* \* \*